United States Patent [19]

Mettler et al.

[11] 4,110,051
[45] Aug. 29, 1978

[54] APPARATUS FOR PRODUCING A NON-RELEASABLE CONNECTION AND NON-RELEASABLE CONNECTION PRODUCED WITH SUCH APPARATUS

[75] Inventors: Karl Mettler, Buchs, Switzerland; Paul Marxer, Eschen, Liechtenstein; Arthur Tiefenthaler, Frastanz, Austria

[73] Assignee: Press- und Stanzwerk AG, Eschen, Liechtenstein

[21] Appl. No.: 799,100

[22] Filed: May 20, 1977

[30] Foreign Application Priority Data

Jun. 3, 1976 [CH] Switzerland ............... 6998/76

[51] Int. Cl.² ................................ F16C 11/06
[52] U.S. Cl. .................... 403/157; 403/261; 403/274; 29/175 A
[58] Field of Search ............ 403/274, 280, 277, 279, 403/261, 247, 284, 359, 157, 242; 29/509, 522, 175 A

[56] References Cited

U.S. PATENT DOCUMENTS

| | | | |
|---|---|---|---|
| 264,502 | 9/1882 | Woolson | 85/37 |
| 672,959 | 4/1901 | Norris | 403/242 |
| 2,724,884 | 11/1955 | Jones | 29/522 UX |
| 2,976,741 | 3/1961 | Martin | 29/509 X |
| 3,734,697 | 5/1973 | Sieghartner | 29/509 X |
| 4,025,208 | 5/1977 | Donahue | 403/157 |

FOREIGN PATENT DOCUMENTS 2,333,040  1/1975  Fed. Rep. of Germany .......... 403/359

*Primary Examiner*—Andrew V. Kundrat
*Attorney, Agent, or Firm*—Werner W. Kleeman

[57] ABSTRACT

An apparatus for producing a non-releasable connection of a component with a shaft protruding into a continuous bore of the component, wherein the bore possesses two bore edges and an inner profile by means of which the shaft is secured against rotation. At one bore edge there bears a shoulder and at the other bore edge a flange of the shaft. The shoulder and flange are formed of one piece with the shaft and conjointly secure the shaft in both directions against axial displacement. In order to form the flange of the shaft by means of cold impact or press forming there is provided a punch possessing a ring-shaped rib at its end face.

The non-releasable connection fabricated with such apparatus is manifested by the features that the component is formed by at least one fork-type joint which is secured at an end of a shaft for steering a vehicle.

1 Claim, 3 Drawing Figures

APPARATUS FOR PRODUCING A NON-RELEASABLE CONNECTION AND NON-RELEASABLE CONNECTION PRODUCED WITH SUCH APPARATUS

BACKGROUND OF THE INVENTION

The present invention relates to a new and improved construction of apparatus for fabricating a non-releasable connection of a component with a shaft which extends into a continuous bore of the component, wherein the bore has two bore edges and an inner profile by means of which the shaft is secured against rotation. Further, at one bore edge there bears a shoulder and at the other bore edge a flange of the shaft, the shoulder and flange being formed of one piece with the shaft and conjointly secure the shaft in both directions against axial displacement.

For the connection of the bifurcated element or fork of a Cardan joint with the corresponding intermediate shaft it is permissible to employ a non-releasable connection. An intermediate shaft is especially required for the steering of a vehicle, if two Cardan joints are arranged between the steering wheel and the front wheels which are to be steered or controlled. In this instance the intermediate shaft section—between both of the Cardan joints—may be non-releasably connected with the fork-type joints provided at its two ends.

SUMMARY OF THE INVENTION

It is a primary object of the present invention to provide an improved apparatus for fabricating a non-releasable connection in an extremely simple, reliable and efficient manner.

Another important object of this invention aims at providing a connection of the character described which is particularly suitable for the aforementioned field of use, and also relates to an apparatus by means of which it is possible to easily fabricate such connection.

Now in order to implement these and still further objects of the invention, which will become more readily apparent as the description proceeds, the apparatus of the present development is manifested by the features that for producing the flange of the shaft by means of a cold impact or press forming technique there is employed a punch having at its end face a substantially ring-shaped rib.

The non-releasable connection which is produced with the apparatus of the invention is manifested by the features that the component is formed by a fork-type joint attached at each end of an intermediate shaft for steering a vehicle.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
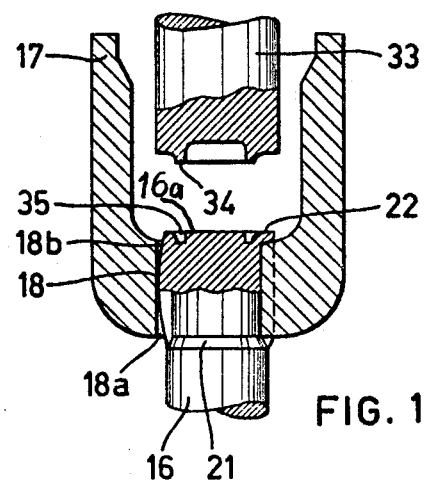
FIG. 1 illustrates a fork and a shaft, partially in sectional view, including a punch.
Figure 2:
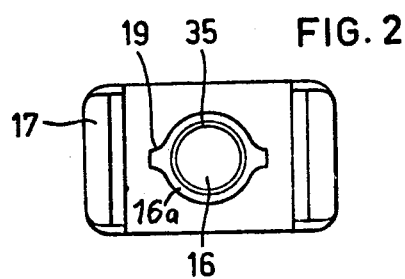
FIG. 2 is a top plan view of the fork and shaft of FIG. 1.
Figure 3:
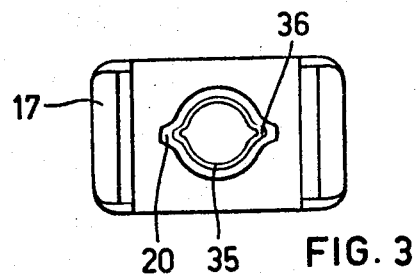
FIG. 3 is a top plan view of the fork and shaft according to another exemplary embodiment.

Describing now the drawings, according to the showing of FIGS. 1, 2 and 3 an intermediate shaft or shaft member 16 for steering a vehicle is axially secured by a shoulder 21 in one direction in a bore 18 of a fork or bifurcated member 17 and by a flange 22 in the other direction, flange 22 preferably extending over the entire periphery of the related shaft end. The shoulder 21 bears at the lower bore edge 18a and the flange 22 at the upper bore edge 18b. By means of a punch 33, which possesses a substantially ring-shaped rib 34, a substantially ring-shaped groove 35 is formed in the end surface 16a of the shaft 16, as best seen by referring to FIG. 2. This ring-shaped groove 35 also can possess two protuberances or cams 36, as apparent from the illustration of FIG. 3. According to the showing of FIG. 3, the shaft possesses two axially parallel wedges or keys 20 and the bore 18 possesses, according to FIG. 2, two profiled grooves 19. The opposite end of the shaft 16 is likewise provided with the described fork member and such attachment arrangement, but to simplify the showing of the drawings the same have not been illustrated.

While there are shown and described present preferred embodiments of the invention, it is to be distinctly understood that the invention is not limited thereto, but may be variously embodied and practiced within the scope of the following claims.

What we claim is:

1. A non-releasable connection comprising the combination of:
   (I) a shaft having a lengthwise axis and a shaft end, said shaft end possessing:
      (a) an end surface having a substantially ring-shaped groove;
      (b) a shoulder spaced in the direction of the lengthwise axis of said shaft from said end surface;
      (c) a flange extending substantially over the entire periphery of said shaft end and formed of one-piece with such shaft end;
      (d) a pair of wedges formed of one-piece with said shaft end and extending substantially parallel to said lengthwise axis of said shaft, said wedges being located essentially diametrically opposite one another at said shaft end; and
      (e) said end surface having a substantially ring-shaped groove provided with two essentially diametrically oppositely situated protuberances located at said wedges;
   (II) a fork member secured to said shaft end and possessing:
      (a) a bore into which extends such shaft end;
      (b) two grooves provided in said bore arranged diametrically opposite one another and into which extend said wedges, in order to thereby secure the fork member against rotation relative to such shaft end; and
      (c) two bore edges, said shoulder bearing against one of said bore edges and said flange bearing against the other bore edge, in order to secure the fork member against axial displacement relative to the shaft end.

* * * * *